United States Patent
Atanasiu et al.

(10) Patent No.: US 11,243,974 B2
(45) Date of Patent: Feb. 8, 2022

(54) SYSTEM AND METHODS FOR DYNAMICALLY CONVERTING NON-DICOM CONTENT TO DICOM CONTENT

(71) Applicant: HYLAND SWITZERLAND SARL, Geneva (CH)

(72) Inventors: Razvan Atanasiu, Victoria, MN (US); Otto Hunter Gasser, Birmingham, AL (US); Larry Robert Sitka, Stillwater, MN (US)

(73) Assignee: Hyland Switzerland Sarl, Geneva (CH)

( * ) Notice: Subject to any disclaimer, the term of this patent is extended or adjusted under 35 U.S.C. 154(b) by 1127 days.

(21) Appl. No.: 15/393,808

(22) Filed: Dec. 29, 2016

(65) Prior Publication Data

US 2018/0189368 A1    Jul. 5, 2018

(51) Int. Cl.
| | | |
|---|---|---|
| *G06F 7/00* | (2006.01) | |
| *G06F 17/30* | (2006.01) | |
| *G06F 16/25* | (2019.01) | |
| *H04L 29/08* | (2006.01) | |
| *G06F 16/93* | (2019.01) | |
| *G06F 16/248* | (2019.01) | |
| *G06F 16/9535* | (2019.01) | |

(52) U.S. Cl.
CPC .......... *G06F 16/258* (2019.01); *G06F 16/248* (2019.01); *G06F 16/93* (2019.01); *G06F 16/9535* (2019.01); *H04L 67/2823* (2013.01)

(58) Field of Classification Search
CPC ......... G06F 17/30569; G06F 17/30554; G06F 17/30867; G06F 17/30011; H04L 67/2823
USPC .......................................................... 707/722
See application file for complete search history.

(56) References Cited

U.S. PATENT DOCUMENTS

| | | | | |
|---|---|---|---|---|
| 6,524,246 | B1 * | 2/2003 | Kelly ................... | A61B 8/0825 600/437 |
| 2002/0019751 | A1 * | 2/2002 | Rothschild ......... | H04N 1/00212 705/3 |
| 2005/0057638 | A1 * | 3/2005 | Nakazawa ............ | G06T 3/4007 347/224 |
| 2006/0064328 | A1 * | 3/2006 | Datta ..................... | G16H 10/60 705/3 |
| 2006/0116902 | A1 * | 6/2006 | Amador ................ | G06Q 10/10 705/2 |
| 2006/0242148 | A1 * | 10/2006 | Rothpearl ............. | G16H 30/20 |
| 2006/0242159 | A1 * | 10/2006 | Bishop ................. | G16H 40/67 |

(Continued)

*Primary Examiner* — Binh V Ho
(74) *Attorney, Agent, or Firm* — Medley, Behrens & Lewis, LLC

(57) ABSTRACT

A method of dynamically converting a document from a non-DICOM format to a DICOM format includes receiving a query for use in searching for the document from one or more repositories, searching the one or more repositories for the document that matches the query, receiving from the one or more repositories one or more document results of the searching, receiving from a user a request for retrieval of at least one document from the one or more document results of the searching, determining if the at least one document requested for retrieval is in the non-DICOM format, upon positive determination, converting the at least one document requested for retrieval from the non-DICOM to the DICOM format, and sending the at least one converted document to the user.

17 Claims, 2 Drawing Sheets

(56) References Cited

U.S. PATENT DOCUMENTS

| | | | |
|---|---|---|---|
| 2007/0203748 A1* | 8/2007 | Rothpearl | G16H 30/20 705/2 |
| 2011/0138269 A1* | 6/2011 | Cordonnier | G16H 10/60 715/239 |
| 2011/0196886 A1* | 8/2011 | Ho | G16H 30/20 707/760 |
| 2012/0173317 A1* | 7/2012 | Kelley | G16H 30/20 705/14.4 |
| 2012/0179670 A1* | 7/2012 | Burke | G06F 16/583 707/722 |
| 2013/0077746 A1* | 3/2013 | Tsuji | A61B 6/463 378/62 |
| 2013/0110543 A1* | 5/2013 | Leighow | G16H 30/20 705/3 |
| 2013/0177222 A1* | 7/2013 | Tridandapani | G16H 30/20 382/128 |
| 2014/0140637 A1* | 5/2014 | Rachev | G16H 40/67 382/305 |
| 2014/0142984 A1* | 5/2014 | Wright | G06F 16/951 705/3 |
| 2014/0143298 A1* | 5/2014 | Klotzer | G06F 16/9577 709/203 |
| 2014/0221835 A1* | 8/2014 | Ota | A61B 8/463 600/443 |
| 2014/0278530 A1* | 9/2014 | Bruce | G16H 40/67 705/3 |
| 2014/0379639 A1* | 12/2014 | Gasser | H04L 67/2842 707/610 |
| 2015/0127379 A1* | 5/2015 | Sorenson | G16H 50/20 705/3 |
| 2015/0150092 A1* | 5/2015 | Raizada | H04L 63/08 726/4 |
| 2016/0246788 A1* | 8/2016 | Thangaraj | G16H 30/20 |
| 2020/0073758 A1* | 3/2020 | Natarajan | H04L 9/3239 |

\* cited by examiner

SYSTEM AND METHODS FOR DYNAMICALLY CONVERTING NON-DICOM CONTENT TO DICOM CONTENT

CROSS REFERENCES TO RELATED APPLICATIONS

None

STATEMENT REGARDING FEDERALLY SPONSORED RESEARCH OR DEVELOPMENT

None.

REFERENCE TO SEQUENTIAL LISTING, ETC.

None.

BACKGROUND

1. Technical Field

The present invention relates generally to a system and methods of converting content from one format to another and more particularly to dynamically converting content from an XDS or non-DICOM format to DICOM upon request for retrieval of the content.

2. Description of the Related Art

A computer network includes a variety of computing devices that communicate and share resources and data. A medical imaging environment, for example, may include a number of networked devices including a medical imaging modality that generates medical images of a patient, a diagnostic view station for displaying the images, an output device for printing the images on film or other media and an archive system for storing the images. These devices are often collectively referred to as a picture archiving and communication system (PACS) and may communicate using a number of protocols. In another example embodiment, a vendor neutral archive (VNA) may be used as a storage device that stores medical images in a standard format and follows a standard interface such that images may be accessed in a vendor-neutral manner by other systems. The American College of Radiology and National Electrical Manufacturers Association developed a protocol referred to as Digital Imaging and Communications in Medicine (DICOM). In general, DICOM defines vendor-independent data formats and data transfer services for electronic medical images. A PACS and/or a VNA permits digital management and sharing of DICOM medical images.

However, health systems and hospitals today generate a multitude of patient-related data that may not be in the DICOM format. Beyond the DICOM content generated through VNAs and PACS in specific health departments such as, for example, the radiology department, other service lines throughout the entire enterprise may generate clinical information in various non-DICOM or Cross-Enterprise Document Sharing (XDS) formats such as, for example, MPEG, PDF, JPEG, avi, PNG, XML, among others.

Cross-Enterprise Document Sharing (XDS) is a technical framework defined by Integrating the Healthcare Enterprise® (IHE) that facilitates the sharing of electronic healthcare documents within and across health enterprises. XDS is based on a generic data model (ebXml 3.0). IHE has defined a set of healthcare specific codes to map XDS to this generic data model. However, the mapping of the data structures of ebXml 3.0 to the semantics of healthcare is not straightforward causing the XDS framework to be complex and difficult for users to manage. Further, creating and compiling a comprehensive patient record to present to a physician becomes a complex task considering various formats that the patient information may be stored in.

As such, there is a need for a solution that allows accessing and/or retrieval of a patient's complete and comprehensive medical records, including DICOM content and non-DICOM content in its native format. There is a need for a method that dynamically converts non-DICOM content to the DICOM format upon a user's request to retrieve the non-DICOM content in its native format.

SUMMARY

System and methods for dynamically converting a document from a non-DICOM format to a DICOM format are disclosed. One example embodiment of the present invention includes a method comprising receiving a query for use in searching for the document from one or more repositories, searching the one or more repositories for the document that matches the query, and receiving from the one or more repositories one or more document results of the searching. The method further comprises receiving from a user a request to retrieve at least one document from the one or more results of the searching received from the one or more repositories, determining if the at least one document requested to be retrieved is in the non-DICOM format, upon determining the document is in the non-DICOM format, converting the at least one document requested for retrieval from the non-DICOM to the DICOM format, and sending the converted at least one document to the user from which the request for retrieval of the document was received.

From the foregoing disclosure and the following detailed description of various example embodiments, it will be apparent to those skilled in the art that the present disclosure provides a significant advance in the art of methods dynamically converting non-DICOM content to a DICOM format upon demand of the content by the user. Additional features and advantages of various example embodiments will be better understood in view of the detailed description provided below.

BRIEF DESCRIPTION OF THE DRAWINGS

The above-mentioned and other features and advantages of the present disclosure, and the manner of attaining them, will become more apparent and will be better understood by reference to the following description of example embodiments taken in conjunction with the accompanying drawings. Like reference numerals are used to indicate the same element throughout the specification.

DETAILED DESCRIPTION OF THE DRAWINGS

Figure 1:
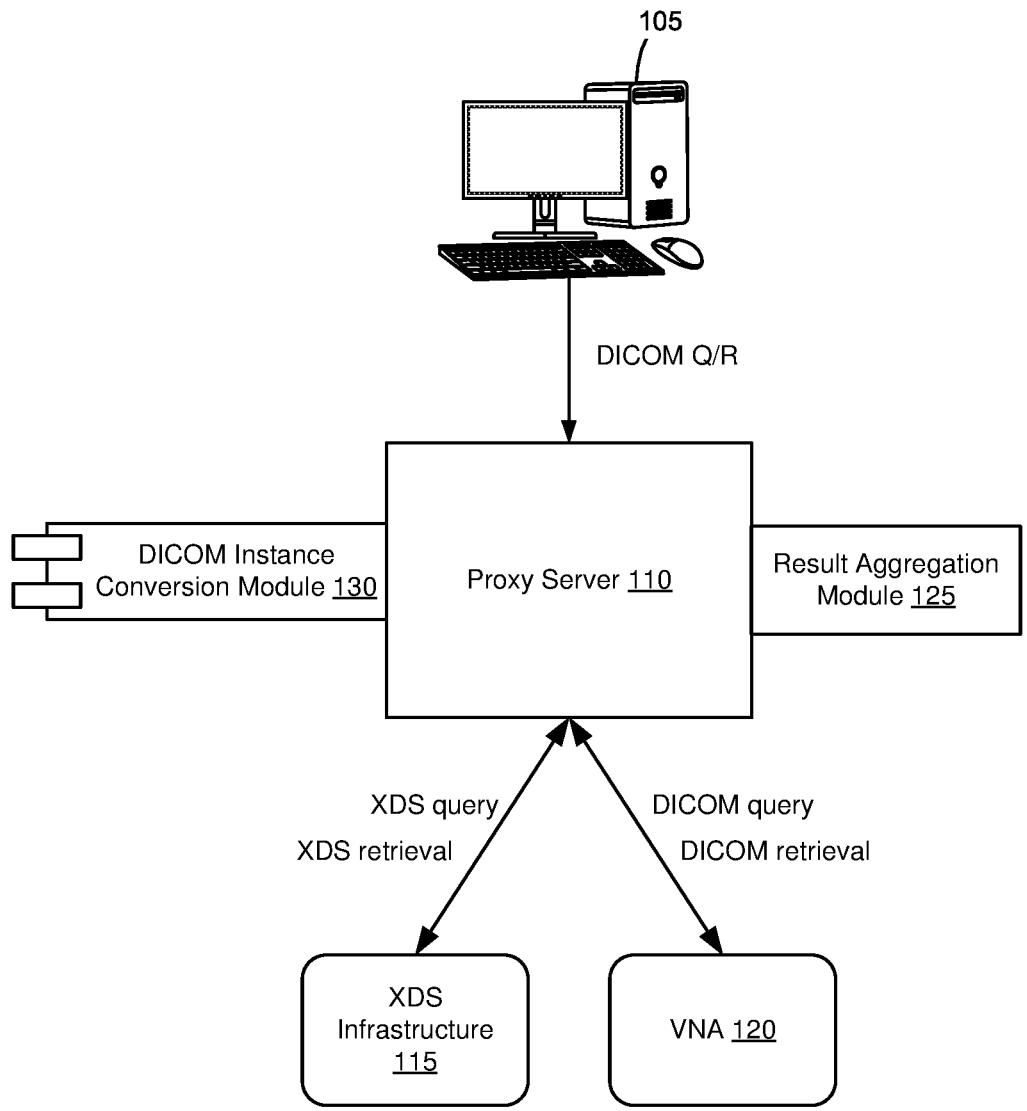
FIG. 1 is a block diagram illustrating an example system to be used in dynamically converting non-DICOM content to DICOM upon a user's request for the content.

It is to be understood that the disclosure is not limited to the details of construction and the arrangement of components set forth in the following description or illustrated in the drawings. The disclosure is capable of other example embodiments and of being practiced or of being carried out in various ways. For example, other example embodiments may incorporate structural, chronological, process, and other changes. Examples merely typify possible variations. Individual components and functions are optional unless explicitly required, and the sequence of operations may vary. Portions and features of some example embodiments may be included in or substituted for those of others. The scope of the disclosure encompasses the appended claims and all available equivalents. The following description is, therefore, not to be taken in a limited sense, and the scope of the present disclosure is defined by the appended claims.

Also, it is to be understood that the phraseology and terminology used herein is for the purpose of description and should not be regarded as limiting. The use herein of "including," "comprising," or "having" and variations thereof is meant to encompass the items listed thereafter and equivalents thereof as well as additional items. Further, the use of the terms "a" and "an" herein do not denote a limitation of quantity but rather denote the presence of at least one of the referenced item.

In addition, it should be understood that example embodiments of the disclosure include both hardware and electronic components or modules that, for purposes of discussion, may be illustrated and described as if the majority of the components were implemented solely in hardware.

It will be further understood that each block of the diagrams, and combinations of blocks in the diagrams, respectively, may be implemented by computer program instructions. These computer program instructions may be loaded onto a general purpose computer, special purpose computer, or other programmable data processing apparatus to produce a machine, such that the instructions which execute on the computer or other programmable data processing apparatus may create means for implementing the functionality of each block or combinations of blocks in the diagrams discussed in detail in the description below.

These computer program instructions may also be stored in a non-transitory computer-readable medium that may direct a computer or other programmable data processing apparatus to function in a particular manner, such that the instructions stored in the computer-readable medium may produce an article of manufacture, including an instruction means that implements the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus implement the functions specified in the block or blocks.

Accordingly, blocks of the diagrams support combinations of means for performing the specified functions, combinations of steps for performing the specified functions and program instruction means for performing the specified functions. It will also be understood that each block of the diagrams, and combinations of blocks in the diagrams, can be implemented by special purpose hardware-based computer systems that perform the specified functions or steps, or combinations of special purpose hardware and computer instructions.

Disclosed are system and methods for dynamically converting data from a native format in a repository such as, for example, an XDS repository into another format such as, for example, DICOM format. One example embodiment of the present disclosure includes receiving a query from a user, triggering a search on one or more repository systems that store content based on the query, receiving one or more search results from the one or more repository systems, aggregating the search results and presenting the results to the user, and awaiting any request from the user to retrieve a content from the aggregated search results. If the user's request includes a request for content in a non-DICOM format, the content may be converted to DICOM prior to transmitting the requested content to the user.

For purposes of the present disclosure, it will be appreciated that the content may refer to files such as, for example, documents, image files, audio files, among others. Content may refer to paper-based records converted into digital files to be used by a computing device. Content may also refer to information that provides value for an end-user or content consumer in one or more specific contexts. Content may be shared via one or more media such as, for example, computing devices in a network.

In an example embodiment, content may refer to computerized medical records, or electronic medical records (EMR), created in a health organization, or any organization that delivers patient care such as, for example, a physician's office, a hospital, or ambulatory environments. EMR may include orders for drug prescriptions, orders for tests, patient admission information, imaging test results, laboratory results, and clinical progress information, among others.

Content may also refer to an electronic health record (EHR) which may be a digital content capable of being distributed, accessed or managed across various health care settings. EHRs may include various types of information such as, for example, medical history, demographics, immunization status, radiology images, medical allergies, personal states (e.g. age, weight), vital signs and billing information, among others. EHR and EMR may also be referred to as electronic patient record (EPR). The terms EHR, EPR, EMR, document, content and object may be used interchangeably for illustrative purposes throughout the present disclosure.

In another example embodiment, content may also refer to DICOM images. DICOM is a standard or specification for transmitting, storing, printing and handling information in medical imaging. Medical imaging, as will be known in the art, may refer to a process and/or technique used to generate images of the human body, or parts or functions thereof, for medical and/or clinical purposes such as, for example, to diagnose, reveal or examine a disease. The standard set by DICOM may facilitate interoperability of various medical imaging equipment across a domain of health enterprises by specifying and/or defining data structures, workflow, data dictionary, compression and workflow, among other things, for use to generate, transmit and access the images and related information stored on the images. DICOM content may refer to medical images following the file format definition and network transmission protocol as defined by DICOM. DICOM content may include a range of biological imaging results and may include images generated through radiology and other radiological sciences, nuclear medicine, thermography, microscopy, microscopy and medical photography, among many others. DICOM content may be referred to hereinafter as images following the DICOM standard, and non-DICOM content for other forms and types of content, as will be known in the art.

Content may be generated and maintained within an institution such as, for example, an integrated delivery network, hospital, physician's office or clinic, to provide patients and health care providers, insurers or payers access to records of a patient across a number of facilities. Sharing of content may be performed using network-connected enterprise-wide information systems, and other similar information exchanges or networks, as will be known in the art.

Metadata may refer to information regarding the content (e.g. DICOM and/or non-DICOM content). Metadata may provide information regarding the content such as, for example, information about a DICOM image data including dimensions, size, modality used to create the data, bit depth, and settings of the medical imaging equipment used to capture the DICOM image. Non-DICOM content may also contain metadata that provides information related to the content. Non-DICOM content metadata may include information such as, for example, a list of a patient's medical history, demographics, immunization status, radiology images, medical allergies, basic patient information, (e.g. age, weight), vital signs and billing information. In an alternative example embodiment, non-DICOM content may include non-DICOM medical image data objects such as, for example, diagnostic objects having standard consumer object formats such as, JPEG, PDF, MPEG, TIFF, WAV, but may not be structured data objects (e.g. DICOM objects). Non-DICOM content may also be objects having no standard information model and wherein its data format does not specify required and/or standard identifying information that is associated with the content.

Content metadata may also refer to "content about content," or "information about content," that allows users to identify the content. Examples of content metadata may include means of content creation, purposes of the content, time and date of content creation, creator of the content, author of the content, standards used in generating the content, origin of the content, information regarding history of the content (e.g. modification history), among many others. Content metadata may be used to search, access, modify or delete content stored in a database. Metadata may be stored and managed in a database such as, for example, a metadata registry.

FIG. 1 is a block diagram illustrating an example system 100 to be used in dynamically converting non-DICOM content to DICOM upon a user's request for the content. System 100 may be used in querying, searching, aggregating, and converting content from one format to another such as, for example, converting content in an XDS native format to DICOM format when the content is requested by the user. System 100 includes a client device 105, a proxy server 110, an XDS infrastructure 115, and a vendor neutral archive (VNA) 120.

Client device 105 may be a computing device or system utilized by a user to query and/or retrieve content from one or more databases such as, for example, XDS infrastructure 115 and VNA 120. Client device 105 may generate query messages using metadata associated with the content and send the query messages to proxy server 110 which processes the query messages and triggers a search for content that matches the query messages from one or more connected systems having repositories or storage devices such as, for example, XDS infrastructure 115 and VNA 120.

In one example embodiment, client device 105 may be an imaging document consumer. An imaging document consumer may query databases for previously published and/or submitted images and retrieve the desired manifest document associated with the requested images. It may then decode the manifest and extract identifiers that uniquely identify the available images. Client device 105 may retrieve the images from an imaging document repository (e.g., VNA 120) via proxy server 110. The images retrieved by client device 105 may be DICOM images. In this example embodiment, client device 105 implements a Query/Retrieve, or Q/R request which refers to a DICOM service for searching DICOM images on a PACS and retrieving a copy of the requested images to client device 105 or any workstation where the requested images may be displayed.

In one example embodiment, client device 105 may communicate with proxy server 110, XDS infrastructure 115, and VNA 120 over a network. In another embodiment, client device 105 may be part of XDS infrastructure 115 or VNA 120 and may communicate with the other computing devices of XDS infrastructure 115 or VNA 120 over any Local Area Network (LAN), Wide Area Network (WAN) or global network.

Proxy server 110 may be a server that receives the query messages from client device 105. In one example embodiment, proxy server 110 may be an aggregation and conversion DICOM proxy server that consolidates all forms of clinical content returned by the connected storage devices that satisfy the query messages sent by the user of client device 105. Proxy server 110 may include one or more modules such as, for example result aggregation module 125 that aggregate results retrieved from the connected storage systems based on the query received from client device 105, and a DICOM instance conversion that dynamically converts non-DICOM results dynamically and on-demand by the user, as will be discussed in greater detail below. In another example embodiment, result aggregation module 125 and DICOM instance conversion module 130 may be remotely connected with proxy service 110 using one or more communication links, as will be known in the art.

XDS infrastructure 115 may be system that implements Cross-Enterprise Document Sharing (XDS) which refers to a technical framework defined by Integrating Healthcare Environments (IHE) that facilitates the registration, distribution and access of patient electronic health records across health enterprises. It provides a standards-based specification for managing the sharing of documents between any healthcare enterprises. XDS infrastructure 115 may be a group of one or more computing devices that includes at least one content source, at least one repository, and at least one registry (not shown). The content source may generate content having metadata. In one example embodiment, the content may an EMR created by the content source, which may include standard clinical and medical data gathered and/or generated in a provider's office. Generating content having metadata may include receiving data from one or more devices such as, for example, a scanner that generates images having metadata, medical imaging equipment that generates DICOM images, or any other computing device such as, for example, a laptop computer, a tablet, a mobile phone and other devices capable of producing content, as will be known in the art. The repository may store the content generated from the at least one content source, and the registry may store metadata associated with the content. The content source may also perform at least one of the following: generation and submission of content and associated metadata to a repository; submission of content as an addendum to another content already present in the repository; submission of content as an alteration of another content already present in the repository such as, for example, updates to an already stored content (e.g. deletion or modification of the content); creation of a folder in the repository; and adding of one or more files or content to an existing folder in the repository.

In one example embodiment, XDS infrastructure 115 may generate and store information that goes beyond standard clinical data collected in a single provider's office and instead, store data from multiple content sources or content providers. XDS infrastructure 115 may also be used to share information with one or more health care providers such as, for example, specialists and laboratories, and content stored in XDS infrastructure 115 may be created and managed by authorized providers across more than one healthcare organization.

XDS infrastructure 115 may be communicatively connected with proxy server 110 and may be used by proxy server 110 to search for and retrieve content requested by the user through client device 105. In one example embodiment, the repositories of XDS infrastructure 115 may store non-DICOM content in its native format. XDS infrastructure 115 may receive query messages from client device 105 through proxy server 110 and return content that satisfy the queries to proxy server 115 for aggregation and return to the requesting user.

VNA server 120 may be a server that stores content such as images and medical documents. In one example embodiment, VNA server 120 may store DICOM images and may receive DICOM queries from client device 105 through proxy server 110. VNA 120 may be configured to receive the search request for one or more electronic medical images, or DICOM content and return the relevant DICOM content to proxy 110 for aggregation at result aggregation module 125 of proxy server 115. In another example embodiment, VNA 120 may be a PACS.

The computing devices of system 100 each include one or more processors communicatively coupled to a computer readable storage medium having computer executable program instructions which, when executed by the processor(s), cause the processor(s) to perform the steps described herein. The storage medium may include read-only memory (ROM), random access memory (RAM), non-volatile RAM (NVRAM), optical media, magnetic media, semiconductor memory devices, flash memory devices, mass data storage devices (e.g., a hard drive, CD-ROM and/or DVD units) and/or other memory as is known in the art. The processor(s) execute the program instructions to perform the steps described herein. The processor(s) may include one or more general or special purpose microprocessors, or any one or more processors of any kind of digital computer. Alternatives include those wherein all or a portion of the processor (s) is implemented by an application-specific integrated circuit (ASIC) or another dedicated hardware component as is known in the art.

Figure 2:
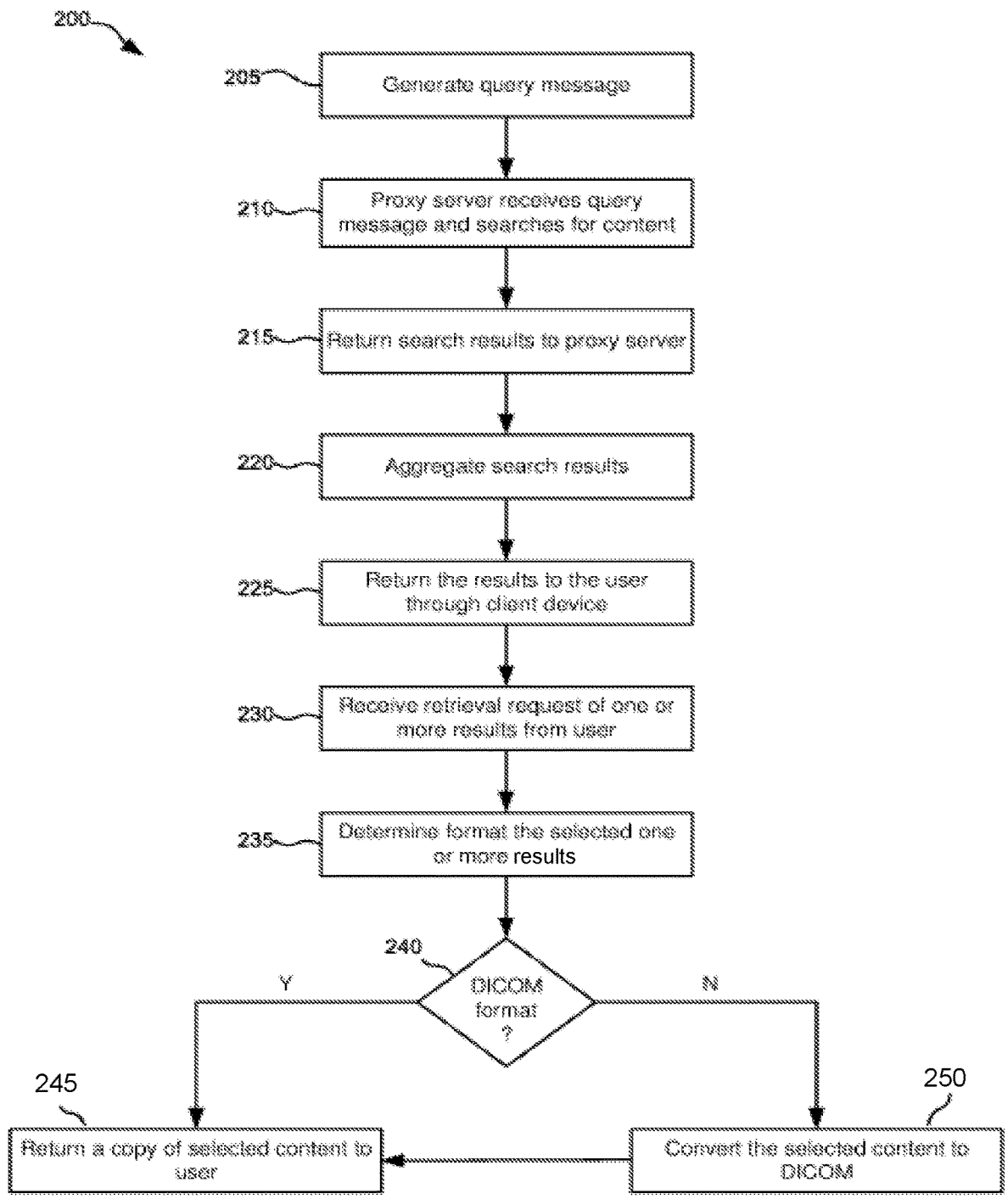
FIG. 2 shows an example method of dynamically converting non-DICOM content to a DICOM format upon request by a user for the non-DICOM content.

FIG. 2 shows an example method 200 for dynamically converting non-DICOM content to a DICOM format upon request by a user for the non-DICOM content. Method 200 may be performed using the computing device components illustrated in system 100.

At block 205, the user generates a query message for use in searching content from one or more repository systems such as, for example XDS infrastructure 115 and VNA 120. For example, a user may request, through client device 105, a search for an object, such as a document, folder, or submission set, stored in at least one of the repositories in XDS infrastructure 115 and VNA 120. Client device 105 may include a graphical user interface (GUI) that facilitates the entry of user inputs to client device 105. A software application may be executed on client device 105 that provides an interface with proxy server 110 for communicating with at least one of XDS infrastructure 115 and VNA 120.

Content, folders, and submission sets may be searched according to a number of parameters and filters. For example, a user may search for a particular type of object, i.e., documents, folders, submission sets or any combination thereof. As desired, a user may search for an object by any of its three main identifiers: Entry Uuid, Unique Id or LID. A user may choose to submit a request to return a list of references to the search result objects (a "find" request) or a request to return the actual objects (a "get" request). A user may search for objects related to a single specified patient, multiple patients or all patients. Document searches may be filtered by, for example, document name, document status, document type, document format, document author, submitting author, the date or time the document was created, submitted or last updated, the date or time the medical procedure leading to the creation of the document was performed, the healthcare institution or type of healthcare institution under which the document was authored or submitted, the type of clinical activity that resulted in the document, the confidentiality of the document or any other suitable metadata field. Searches may be filtered by any suitable metadata value and a user may search for a content associated with a specified metadata as will be indicated in the query message generated by the user through client device 115.

In one example embodiment, the query may be a DICOM query or a C-Find request which, in addition to searching VNA 110, will also be used to query repositories in XDS infrastructure 115. At block 210, proxy server 110 receives the query message from client device 115 and triggers a search for content that matches the query in each of the storage devices in XDS infrastructure 115 and VNA 120. Triggering a search for content at XDS infrastructure 115 may include sending an XDS query to one or more repositories in XDS infrastructure 115. Similarly, triggering a search for content at VNA 120 may include sending a DICOM query to one or more repositories in VNA 120.

At block 215, each of the repositories in XDS infrastructure 115 and VNA 120 may return search results that match the query message specified by the user through client device 115. Proxy server 110 may aggregate all the results returned from each of XDS infrastructure 115 and VNA 120 through result aggregation module 125 (at block 220), and return and display the aggregated results to the user through client device 115 (at block 225). The aggregated results may be a combination of DICOM content returned by VNA 120, and non-DICOM content in their native format returned by XDS infrastructure 115.

Proxy server 110 may allow the user to select a search result from the list of aggregated search results and request for retrieval of the content as indicated by the selected search result (at block 230). The retrieval request may be a DICOM retrieval request or C-Move which may be made at the study level. The C-MOVE operation may allow an application in proxy server 110 to instruct another application entity to transfer stored instances of the document to client device 105 using the C-STORE operation. At block 235, proxy server 110 may determine the format of the content requested by the user for retrieval. If the requested content is in a DICOM format (at block 240), proxy server 110 returns a copy of the requested content to the user and the content is displayed on the interface of client device 105 (at block 245). If the requested content is determined to be in a non-DICOM format, proxy server 110 may convert the requested content to a DICOM format (at block 250), and return a copy of the converted requested content to the user to be displayed on the interface of client device 105 (at block 245). In one example embodiment, the XDS or non-DICOM document may be returned as a DICOM object that belongs to a standalone study, or as an object that belongs to an existing imaging study hosted by VNA 125.

Converting the requested content to a DICOM format may be performed by the DICOM instance conversion module 130 by adding structured aspects of DICOM data objects to the non-DICOM content requested by the user. In one example embodiment, DICOM instance conversion module 130 may wrap the non-DICOM content thereby creating a DICOM header containing metadata elements required in headers of standard DICOM content. Wrapping may convert the original non-DICOM content in its native format to a DICOM Service-Object Pair (SOP) class that closely approximates the original content. In one example embodiment, wrapping may be performed using group tags (e.g., 0042 tags), document name, MIME type, and stream of bytes. In another example embodiment, DICOM encapsulation may be performed where a standard DICOM header may be created, and the pixel data of the non-DICOM content may be converted to a format that is normalized for the DICOM format, and the original content is encapsulated in a set of DICOM tags. DICOM instance conversion module 130 may add metadata values to the non-DICOM content such as, for example, associate the non-DICOM content with a study by specifying a unique identifier for the study (e.g., Study Instance UID), specify a modality or type of equipment that was used to acquire the data used to create the content or images in the datasets, and indicate a unique identifier for a series instance (e.g., Series Instance UID).

The requested non-DICOM content may be converted into a valid DICOM object, and the conversion may be consistent and repeatable for a plurality of non-DICOM documents through the use of consistent UIDs. UIDs may be provided by the user through the query message, or may be automatically determined based on the query message received by proxy server 110 from client device 105.

In another example embodiment, more attributes or metadata may be added or modified to the non-DICOM content such as, for example, patient attributes. For example, DICOM instance conversion module 130 may add or associate attributes to the non-DICOM content such as, for example, patient's name, patient's birth date, patient ID, patient's gender, among others. Study attributes may also be associated with the converted content such as, for example, study ID or user- and/or equipment-generated study identifiers, study description, study time, physician(s) responsible for the overall patient care at the time of the study, among others. Series attributes may also be added such as, series number that identifies this series, physician(s) administering the series, user-provided description of the series, among other series attributes as will be known in the art. Other methods of converting an unstructured or non-DICOM requested data object to a DICOM data object may be performed as will be known in the art.

In one example embodiment, the converted content may be stored in a cache. If a study association may be performed based on a value of the reference ID list slot wherein the documents to be returned has the same accession number, the documents may not be returned to client device 105 as a separate result since the content will be associated with a document study. In another example embodiment, the requested and converted document may be added to a patient's DICOM timeline and retrieved prior to the user requesting for the document via DICOM Q/R operations.

It will be understood that the example applications described herein are illustrative and should not be considered limiting. It will be appreciated that the actions described and shown in the example flowcharts may be carried out or performed in any suitable order. It will also be appreciated that not all of the actions described in FIG. 2 need to be performed in accordance with the example embodiments of the disclosure and/or additional actions may be performed in accordance with other example embodiments of the disclosure.

Many modifications and other example embodiments of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of dynamically converting an electronic document from a non-DICOM format to a DICOM format, the method comprising:
   receiving a query for use in searching for the electronic document in a first electronic repository and a second electronic repository, wherein the first electronic repository stores first content in the non-DICOM format, wherein the second electronic repository stores second content in the DICOM format;
   searching the first electronic repository for the electronic document that matches the query;
   receiving, from the first electronic repository, first one or more electronic document results of the searching of the first electronic repository;
   searching the second electronic repository for the electronic document that matches the query;
   receiving, from the second electronic repository, second one or more electronic document results of the searching of the second electronic repository;
   aggregating the first one or more electronic document results from the first electronic repository and the second one or more electronic document results from the second electronic repository to form aggregated results;
   sending the aggregated results to a device of a user;
   receiving, from the device of the user, a request for retrieval of at least one electronic document from the aggregated search results;
   determining if the at least one electronic document requested for retrieval is in the non-DICOM format; and
   upon positive determination:
   converting the at least one electronic document requested for retrieval from the non-DICOM format to the DICOM format by adding structured aspects of DICOM data objects to the non-DICOM format;
   adding the at least one converted electronic document to a DICOM timeline of a specified patient; and
   sending the at least one converted electronic document to the device of the user.

2. The method of claim 1, wherein the converting the at least one electronic document requested for retrieval from the non-DICOM format to the DICOM format includes wrapping the at least one electronic document with a DICOM metadata header.

3. The method of claim 1, further comprising:
   receiving a unique identifier to be added to the at least one electronic document upon the converting from the non-DICOM format to the DICOM format of the at least one electronic document requested for retrieval.

4. The method of claim 1, further comprising:
associating the at least one electronic document requested for retrieval to a DICOM study.

5. The method of claim 1, wherein the first electronic repository comprises a Cross-Enterprise Document Sharing (XDS) electronic repository, wherein the second electronic repository comprises a vendor neutral archive (VNA).

6. The method of claim 1, wherein the receiving the query for use in searching for the electronic document includes receiving a DICOM query for the electronic document.

7. The method of claim 1, wherein the aggregated results are displayed on a display of the device.

8. The method of claim 1, further comprising:
upon negative determination:
sending the at least one electronic document to the device of the user.

9. A computing device having a non-transitory computer readable storage medium containing one or more instructions for dynamically converting electronic content from a non-DICOM format to a DICOM format, the one or more instructions comprising:
receiving a query to be used in searching for the electronic content in a first electronic storage system and a second electronic storage system, wherein the first electronic storage system stores first electronic content in the non-DICOM format, wherein the second electronic storage system stores second electronic content in the DICOM format;
searching the first electronic storage system for the electronic content based upon the query;
receiving, from the first electronic storage system, first one or more electronic content that matches the query;
searching the second electronic storage system for the electronic content based upon the query;
receiving, from the second electronic storage system, second one or more electronic content that matches the query;
aggregating the first one or more electronic content from the first electronic storage system and the second one or more electronic content from the second electronic storage system to form aggregated results;
sending the aggregated results to a device of a user;
receiving, from the device of the user, a request to retrieve at least one electronic content from the aggregated results;
determining if the at least one electronic content requested to be retrieved is in the non-DICOM format; and
upon positive determination:
converting the at least one electronic content from the non-DICOM format to the DICOM format by adding structured aspects of DICOM data objects to the non-DICOM format;
adding the converted at least one electronic content to a DICOM timeline of a specified patient; and
sending the converted at least one electronic content to the device of the user.

10. The computing device of claim 9, wherein the first electronic storage system comprises a Cross-Enterprise Document Sharing (XDS) storage system, wherein the second electronic storage system comprises a vendor neutral archive (VNA).

11. The computing device of claim 9, the one or more instructions further comprising:
adding metadata to the at least one electronic content.

12. The computing device of claim 9, the one or more instructions further comprising:
upon negative determination:
sending the at least one electronic content to the device of the user.

13. A system for dynamically converting an electronic document from a non-DICOM format to DICOM format, the system comprising:
a client device for generating a query for use in searching for the electronic document;
a search server for receiving the query from the client device, and for sending the query to a first electronic repository system and a second electronic repository system;
the first electronic repository system for searching for first one or more electronic documents that match the query received from the search server, and for returning first one or more results of the searching to the search server, wherein the first electronic repository system stores first electronic documents in the non-DICOM format; and
the second electronic repository system for searching for second one or more electronic documents that match the query received from the search server, and for returning second one or more results of the searching to the search server, wherein the second electronic repository system stores second electronic documents in the DICOM format,
wherein the search server aggregates first search results received from the first electronic repository system and second search results received from the second electronic repository system to form aggregated search results, receives a request from the client device to retrieve at least one electronic document that matches the query in the aggregated search results, determines if the at least one electronic document is in the non-DICOM format, and upon positive determination, converts the at least one electronic document from the non-DICOM format to the DICOM format by adding structured aspects of DICOM data objects to the non-DICOM format, and returns the converted at least one electronic document to the client device, wherein the converted at least one electronic document is added to a DICOM timeline of a patient.

14. The system of claim 13, wherein the first electronic repository system is a Cross-Enterprise Document Sharing (XDS) electronic repository system.

15. The system of claim 13, wherein the second electronic repository system is a vendor neutral archive (VNA).

16. The system of claim 13, wherein the search server sends an XDS query to the first electronic repository system, the XDS query based on the query received from the client device.

17. The system of claim 13, wherein the search server sends a DICOM query to the second electronic repository system, the DICOM query based on the query received from the client device.

* * * * *